Dec. 6, 1938.   G. WEGGUM   2,139,396

CABLE PROTECTING DEVICE

Filed June 6, 1936

Inventor
Gust Weggum
By
Attorneys

Patented Dec. 6, 1938

2,139,396

UNITED STATES PATENT OFFICE 2,139,396

CABLE PROTECTING DEVICE

Gust Weggum, Cooley, Minn., assignor to The Reclamation Company, a corporation of Delaware Application June 6, 1936, Serial No. 83,927

4 Claims. (Cl. 254—190)

It is an object of this invention to provide a novel and efficient device adapted to be secured to a cable adjacent to a fixed head or end fastening member on the cable and so formed and arranged relative to a sheave or drum over which the cable is trained that abrupt bending of the cable is prevented when, for example, such head is brought into contact with the sheave or drum at the extremity of the movement permitted by said head.

One important field of use for the present device is on the cables for operating the dippers of power shovels. Heretofore, in the operation of such shovels, expensive interruptions for repairs have been made necessary by the breaking of the cables where they have been bent abruptly in operation. Such bending often occurs at the junction of the cable with the head secured to the end of the cable, because, as the bucket or dipper is drawn to the upper extremity of its movement, the head starts around the boom point sheave and abruptly bends the cable. I provide an inexpensive device for guarding against the breakage resulting from such bends.

Figure 1:
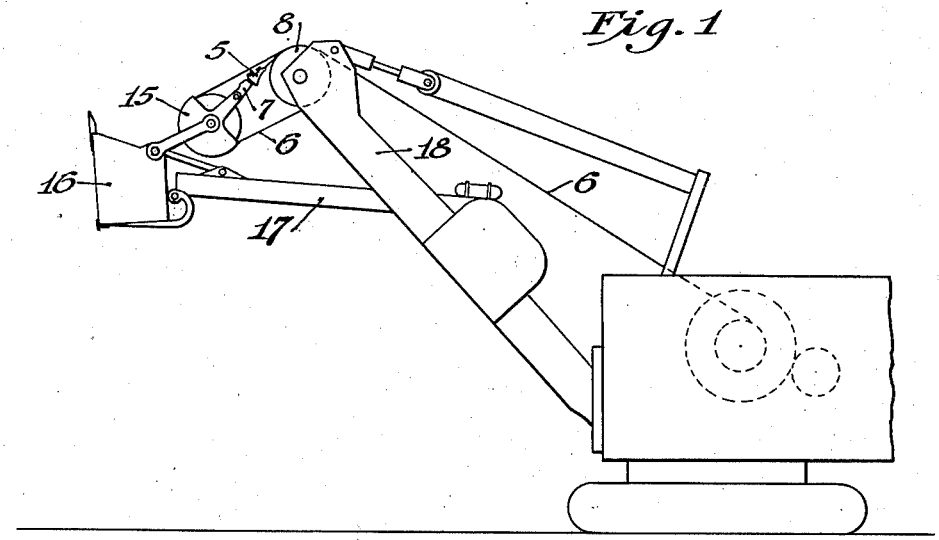
Figure 2:
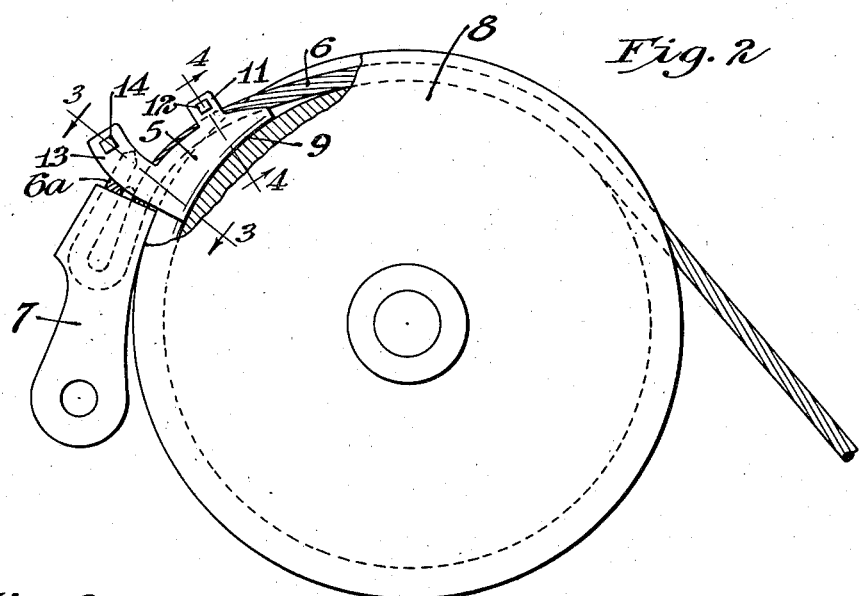
Figure 3:
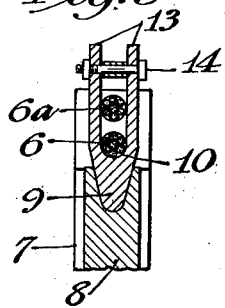
Figure 4:
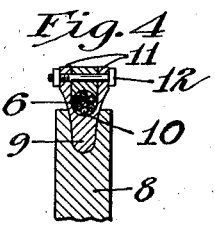

Referring to the accompanying drawing, which illustrates the best form of my device at present known to me, Figure 1 is a diagrammatic side elevation showing my device attached to a power shovel;

Fig. 2 is a side elevation of the device in my new combination with a cable, head and sheave, the latter being shown partly in central, vertical section, and Figs. 3 and 4 are sections taken respectively on the lines 3—3 and 4—4 of Fig. 2.

My device, indicated generally by the numeral 5, is shown attached to a cable 6 adjacent to a head 7 for securing an end of the cable to a part to be operated thereby and the cable is shown trained on a sheave 8. An inner edge 9 of the device has an arcuate form adapted to fit in the peripheral groove in the sheave 8, as indicated in Fig. 2, and extending longitudinally of the outer edge of the device is an arcuate groove 10 to receive the cable 6. The groove 10 is not concentric with the arcuate edge 9 but diverges therefrom toward the head 7 so that the part of the device which separates the cable from the sheave is approximately wedge shaped longitudinally.

To secure the device to the cable, I provide a pair of lugs 11 projecting at a point removed from the head 7 and these lugs are perforated to receive a clamping bolt 12. Near the larger end of the device, a pair of guide flanges 13 are formed. These flanges are preferably formed with arcuate end surfaces abutting against the head 7 and perform the function of retaining the cable in alignment with the groove 10 while permitting movement of the cable to a tangential position relative to said groove. A bolt 14 is fastened in perforations near the outer ends of the flanges 13 to confine the cable and limit movement thereof relative to attachment. The free end 6a of the cable 6 is preferably confined between the guide flanges 13 to aid in maintaining the device 5 in proper alignment with the groove in the pulley 8.

An important use of the device is illustrated in Fig. 1. As here illustrated, the device 5 is secured to the cable 6 adjacent to the head 7 which secures an end of said cable to a dipper sheave block 15 attached in suitable manner to a dipper or bucket 16 of a power shovel. The shovel has a dipper handle 17 which is pivoted and movable longitudinally relative to a boom 18. The cable 6 is employed to raise the dipper and is trained on the boom point sheaves 8.

In operation the dipper is frequently raised to the upper extremity of its movement. When this occurs the head 7 engages and starts around the sheave 8 and in the absence of my protecting device, the cable is abruptly bent at the point where the tangent to the sheave groove intersects the plane where the cable enters the head 7. Such abrupt bending causes the cable to break frequently and costly shutdowns for repairs are necessary.

By the use of my device it will be evident from Fig. 2 that abrupt bending of the cable is prevented without interfering with the full range of movement of the bucket. The wedge-shaped body of the member 5 passes into the groove of the sheave while the cable 6 is gradually bent around the arc of the groove 10. In passing into engagement with the sheave, the head 7 moves relative to the device 5 within the range permitted by the guide flanges 13 so that the cable passes freely, smoothly and without sharp bend to the upper extremity of movement permitted by the head 7.

Having described my invention, what I claim as new and desire to protect by Letters Patent is:

1. The combination with a cable, a head secured to said cable and a sheave having a groove in which said cable is trained, of an arcuate protecting device secured to said cable adjacent to said head, said device extending circumferentially to said sheave between said cable and sheave and having a channel for said cable merging gradually into the groove of said sheave to cause said cable to bend gradually from said sheave to said head when said head is actuated to contact the periphery of said sheave.

2. The combination with a cable, a head secured to said cable and a sheave having a peripheral groove in which said cable is trained, of a protecting device secured to said cable adjacent to said head, said device having a tapered end adapted to enter said groove and a channel for said cable merging gradually into the groove of said sheave to afford a guide for said cable insuring gradual bending of the cable from said sheave to said head when said head is actuated against said sheave.

3. The combination with a cable, a head secured to said cable and a sheave having a groove in which said cable is trained, of a cable protecting device extending longitudinally of said cable adjacent to said head, means securing said device at a point remote from said head to said cable, the inner surface of said device being formed to fit in said groove, and the outer surface thereof being formed with a groove diverging from said inner surface toward said head to receive said cable, and a guide for said cable comprising parallel flanges projecting from said device substantially perpendicularly to the axis of said sheave adjacent to said head and permitting relative movement between said head and device, in the plane of said sheave.

4. The combination with a cable, a head secured to said cable and a rotary member on which said cable is trained, of a cable protecting device extending longitudinally of said cable adjacent to said head, means securing said device at a single point to said cable, the inner, longitudinal surface of said device being formed to engage the circumference of said rotary member, and the outer surface thereof diverging from said inner surface toward said head to receive said cable and a guide for said cable comprising parallel flanges integral with said device and projecting substantially perpendicularly to the axis of said rotary member at a point remote from said securing means and permitting relative movement between said head and device radially of said rotary member.

GUST WEGGUM.